US012592837B2

(12) United States Patent
Riva

(10) Patent No.: US 12,592,837 B2
(45) Date of Patent: Mar. 31, 2026

(54) PKI-BASED AUTHENTICATION OF BLOCKCHAIN ADDRESSES

(71) Applicant: PayPal, Inc., San Jose, CA (US)

(72) Inventor: Ben Riva, Givatayim (IL)

(73) Assignee: PayPal, Inc., San Jose, CA (US)

( * ) Notice: Subject to any disclaimer, the term of this patent is extended or adjusted under 35 U.S.C. 154(b) by 262 days.

(21) Appl. No.: 17/654,471

(22) Filed: Mar. 11, 2022

(65) Prior Publication Data

US 2023/0291575 A1 Sep. 14, 2023

(51) Int. Cl.
| | |
|---|---|
| *H04L 9/32* | (2006.01) |
| *G06F 16/955* | (2019.01) |
| *H04L 9/00* | (2022.01) |

(52) U.S. Cl.
CPC .......... *H04L 9/3268* (2013.01); *G06F 16/955* (2019.01); *H04L 9/50* (2022.05)

(58) Field of Classification Search
CPC ....... H04L 9/3268; H04L 9/50; H04L 9/3263; H04L 63/0823; H04L 63/126; H04L 9/3247; G06F 16/955
See application file for complete search history.

(56) References Cited

U.S. PATENT DOCUMENTS

| | | | | |
|---|---|---|---|---|
| 10,102,526 | B1 * | 10/2018 | Madisetti ............. | G06Q 20/389 |
| 2016/0255082 | A1 * | 9/2016 | Rathod ................. | G06Q 50/01 |
| | | | | 726/1 |

| | | | | |
|---|---|---|---|---|
| 2017/0236104 | A1 * | 8/2017 | Biton ................... | G06Q 20/389 |
| | | | | 705/64 |
| 2017/0300901 | A1 * | 10/2017 | Kote ..................... | H04L 63/062 |
| 2018/0183587 | A1 | 6/2018 | Won et al. | |
| 2019/0013932 | A1 * | 1/2019 | Maino ................... | H04L 9/3242 |
| 2019/0044700 | A1 * | 2/2019 | Leddy ................ | G06Q 30/0185 |
| 2020/0005290 | A1 * | 1/2020 | Madisetti ............. | G06Q 20/065 |
| 2020/0013026 | A1 * | 1/2020 | Noonan ........... | G06Q 20/38215 |
| 2020/0044862 | A1 | 2/2020 | Yadlin et al. | |

(Continued)

OTHER PUBLICATIONS

M. Turkanović and B. Podgorelec, "Signing Blockchain Transactions Using Qualified Certificates," in IEEE Internet Computing, vol. 24, No. 6, pp. 37-43, Nov. 1-Dec. 2020 (Year: 2020).*

(Continued)

*Primary Examiner* — Jung W Kim
*Assistant Examiner* — Sameera Wickramasuriya
(74) *Attorney, Agent, or Firm* — Kowert, Hood, Munyon, Rankin & Goetzel, P.C.; Dean M. Munyon

(57) ABSTRACT

Techniques are disclosed relating to determining identity information of a user associated with a blockchain address. An application of a first user can receive information indicative of a blockchain address of a second user. This information either includes or is usable to retrieve a certificate of the second user, which is signed by a private key of a certificate authority (CA), and which includes identity information of the second user. The application of the first user can verify the certificate using a public key of the CA. The application of the first user can then cause identity information of the second user to be included in a user interface presented to the first user. This information allows the first user to have more information about the second user before commencing an irreversible blockchain transaction with that user.

20 Claims, 11 Drawing Sheets

(56) References Cited

U.S. PATENT DOCUMENTS

| | | | |
|---|---|---|---|
| 2020/0073864 A1* | 3/2020 | Jo | G06F 21/64 |
| 2020/0117656 A1* | 4/2020 | Royyuru | G06F 16/27 |
| 2020/0213127 A1* | 7/2020 | Maniyar | G06F 16/2379 |
| 2020/0366480 A1* | 11/2020 | Noonan | G06Q 20/38215 |
| 2021/0067496 A1* | 3/2021 | Madisetti | H04L 63/061 |
| 2021/0083882 A1* | 3/2021 | Venable, Sr. | H04L 9/3268 |
| 2021/0383377 A1* | 12/2021 | Zhou | H04L 9/3213 |
| 2022/0027903 A1 | 1/2022 | Wright et al. | |
| 2022/0182375 A1* | 6/2022 | Xu | H04L 63/0876 |

OTHER PUBLICATIONS

A. Singla and E. Bertino, "Blockchain-Based PKI Solutions for IoT," 2018 IEEE 4th International Conference on Collaboration and Internet Computing (CIC), Philadelphia, PA, USA, 2018, pp. 9-15. (Year: 2018).*
D. Pavithran and K. Shaalan, "Towards Creating Public Key Authentication for IoT Blockchain," 2019 Sixth HCT Information Technology Trends (ITT), Ras Al Khaimah, United Arab Emirates, 2019, pp. 110-114 (Year: 2019).*
Toorani, Mohsen, and Christian Gehrmann. "A decentralized dynamic PKI based on blockchain." Proceedings of the 36th annual ACM symposium on applied computing. 2021. (Year: 2021).*
International Search Report and Written Opinion for Application No. PCT/US2023/063929 mailed on Jul. 27, 2023, 14 pages.
Mike Malone, "Everything you should know about certificates and PKI but are too afraid to ask," 2018-12-11; https://smallstep.com/blog/everything-pki/; 28 pages. [Retrieved Oct. 12, 2021].
Public Key Infrastructure; https://www.tutorialspoint.com/cryptography/public_key_infrastructure.htm; 4 pages. [Retrieved Oct. 12, 2021].
Public Key Infrastructure (PKI) in the Cloud—Infosec Resources; Jun. 30, 2014 by Security Ninja; https://resources.infosecinstitute.com/topic/public-key-infrastructure-pki-cloud/; 4 pages. [Retrieved Oct. 12, 2021].
What is PKI? Public Key Infrastructure | Fortinet; https://www.fortinet.com/resources/cyberglossary/public-key-infrastructure; 5 pages. [Retrieved Oct. 12, 2021].
Rotating AWS KMS keys; https://docs.aws.amazon.com/kms/latest/developerguide/rotate-keys.html; 5 pages. [Retrieved Oct. 12, 2021].
Wikipedia, "Shamir's Secret Sharing," https://en.wikipedia.org/wiki/Secret_sharing; page last edited on Aug. 15, 2021; 7 pages.

* cited by examiner certificate lookup
266
(<address>, <tag>)

registration request 310
(<address>, <tag>,
registration information)

450A

"Address X belongs to S" ⌐ 422

S public key⌐ 242

S Signature ——— 252

450B

"Address X belongs to S" ⌐ 422
S public key⌐ 242
S Name— 424
S Website
⌐ 426

S Signature ——— 252

440A

440B

460

254A

254B

570A

*Are you sure you want to make a blockchain transaction to the address "0x0eb81892540747ec60f1389ec734a2c06b898ec8"?*

*User name: Acme, Inc.*
*User address : 123 Main St. Peoria, IL 61525*
*User website: acmeinc.com*
*Number of transactions: 732*
*Last transaction: 2/22/2022 14:40 GMT*

| YES | NO |
|-----|-----|

570B

*Are you sure you want to make a blockchain transaction to 'Acme, Inc.'?*

*User address : 123 Main St. Peoria, IL 61525*
*User website: acmeinc.com*
*Risk score: Safe*

| YES | NO |
|-----|-----|

Figure 6A:
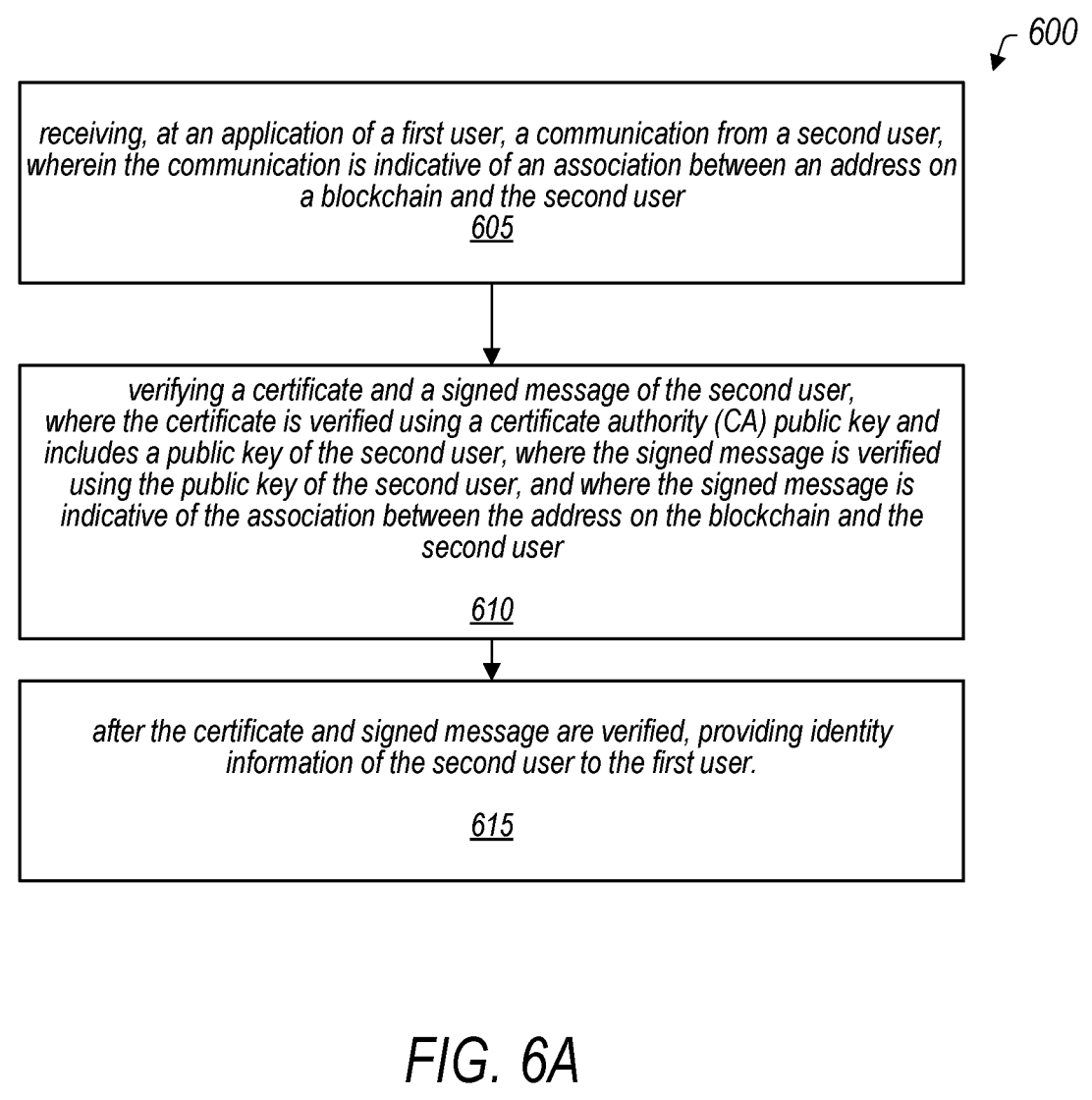

```
receiving, at an application of a first user, a communication from a second user,
wherein the communication is indicative of an association between an address on
a blockchain and the second user
605
```

```
verifying a certificate and a signed message of the second user,
where the certificate is verified using a certificate authority (CA) public key and
includes a public key of the second user, where the signed message is verified
using the public key of the second user, and where the signed message is
indicative of the association between the address on the blockchain and the
second user

610
```

```
after the certificate and signed message are verified, providing identity
information of the second user to the first user.

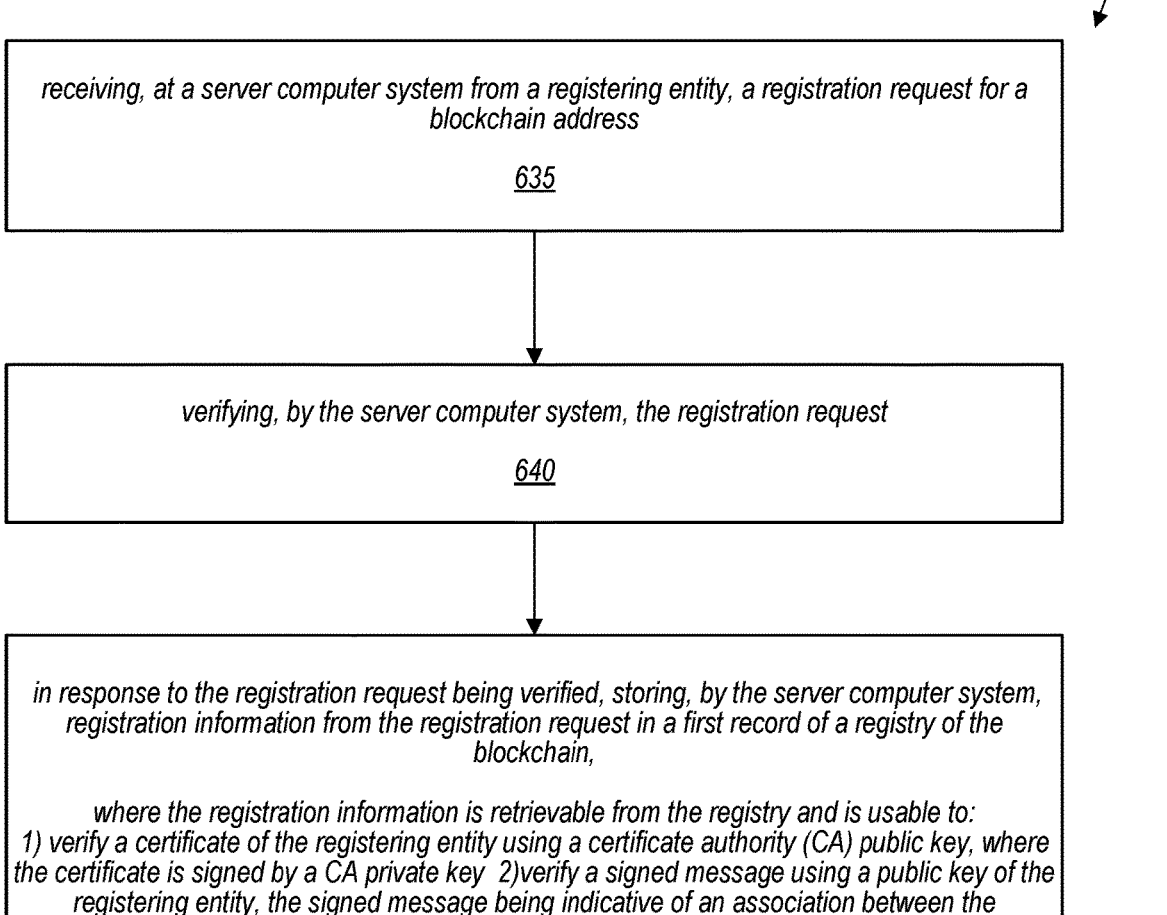

*630* receiving, at a server computer system from a registering entity, a registration request for a blockchain address

*635* verifying, by the server computer system, the registration request

*640* in response to the registration request being verified, storing, by the server computer system, registration information from the registration request in a first record of a registry of the blockchain, where the registration information is retrievable from the registry and is usable to:
1) verify a certificate of the registering entity using a certificate authority (CA) public key, where the certificate is signed by a CA private key  2)verify a signed message using a public key of the registering entity, the signed message being indicative of an association between the blockchain address and the registering entity and 3)determine identity information of the registering entity

660 detecting, by an application executing on a computer system, a request for a first user to perform a blockchain transaction, the request including information specifying a blockchain address of a second user on a blockchain

665 invoking, by the application, an application programming interface (API) of a registry of the blockchain, where the invoking includes passing the blockchain address as a parameter of the API

670 identifying, by the application in response to information returned from the registry, registered information  stored in a record of the registry that corresponds to the address

675 verifying, by the application, the certificate information, where the verifying includes:
1) verifying a certificate of the second user using a certificate authority (CA) public key, the certificate including a public key of the second user and 2)verifying a signed message of the second user using the public key of the second user, the signed message being indicative of the association between the blockchain address and the second user, and the signed message being signed by a private key of the second user

680 providing, by the application, identity information of the second user to the first user, in response to the certificate information being verified

PKI-BASED AUTHENTICATION OF BLOCKCHAIN ADDRESSES

BACKGROUND

Technical Field

This disclosure relates generally to blockchains, and, more specifically, to authentication of destination addresses on the blockchain.

Description of the Related Art

A "blockchain" refers to technology that facilitates the process of recording and sharing information. In particular, blockchains store data in a manner that makes it very difficult for a malicious user to corrupt. Blockchains are commonly used to store information for any number of applications, including financial transactions, securing personal data, supply chain monitoring, etc.

As the name suggests, a blockchain stores its information in a series of chunks, or "blocks." Each block may include its own hash value, timestamped transaction, and a hash value of the previous block. The previous block hash links blocks together, which enables a chain of blocks to be created. The use of the previous block hash prevents a block from being altered or a block being inserted between two blocks.

A blockchain is one implementation of distributed ledger technology, in which multiple independent computer systems (or nodes) each have their own copies of a ledger that stores blockchain transactions. Each copy is considered a "peer" of the others. When a blockchain transaction causes a change to occur to one copy of the ledger, the blockchain operates such that the same change occurs to the other copies of the ledger.

An account on a blockchain is based on establishment of a blockchain public-private key pair for the account holder. The blockchain private key, which should be known only to the account holder, is used to sign a transaction. Because the signature of this transaction can be verified using the account holder's blockchain public key, this action indicates to the rest of the blockchain system that the account holder has the authority to initiate a transaction involving the corresponding account. Another account in the transaction can be specified using an address, which is typically a shorter version of the other account's blockchain public key.

BRIEF DESCRIPTION OF THE DRAWINGS

FIG. 5B depicts example user interfaces that provide, to a first user, identity information of a second user associated with a blockchain address.

FIG. 6A is a flow diagram of one embodiment of a method for verifying identity information of a blockchain user.

FIG. 6B is a flow diagram of one embodiment of a method for registering a blockchain address in a blockchain registry.

FIG. 6C is a flow diagram of one embodiment of a method for performing a lookup of a blockchain address in a blockchain registry.

DETAILED DESCRIPTION

Figure 1:
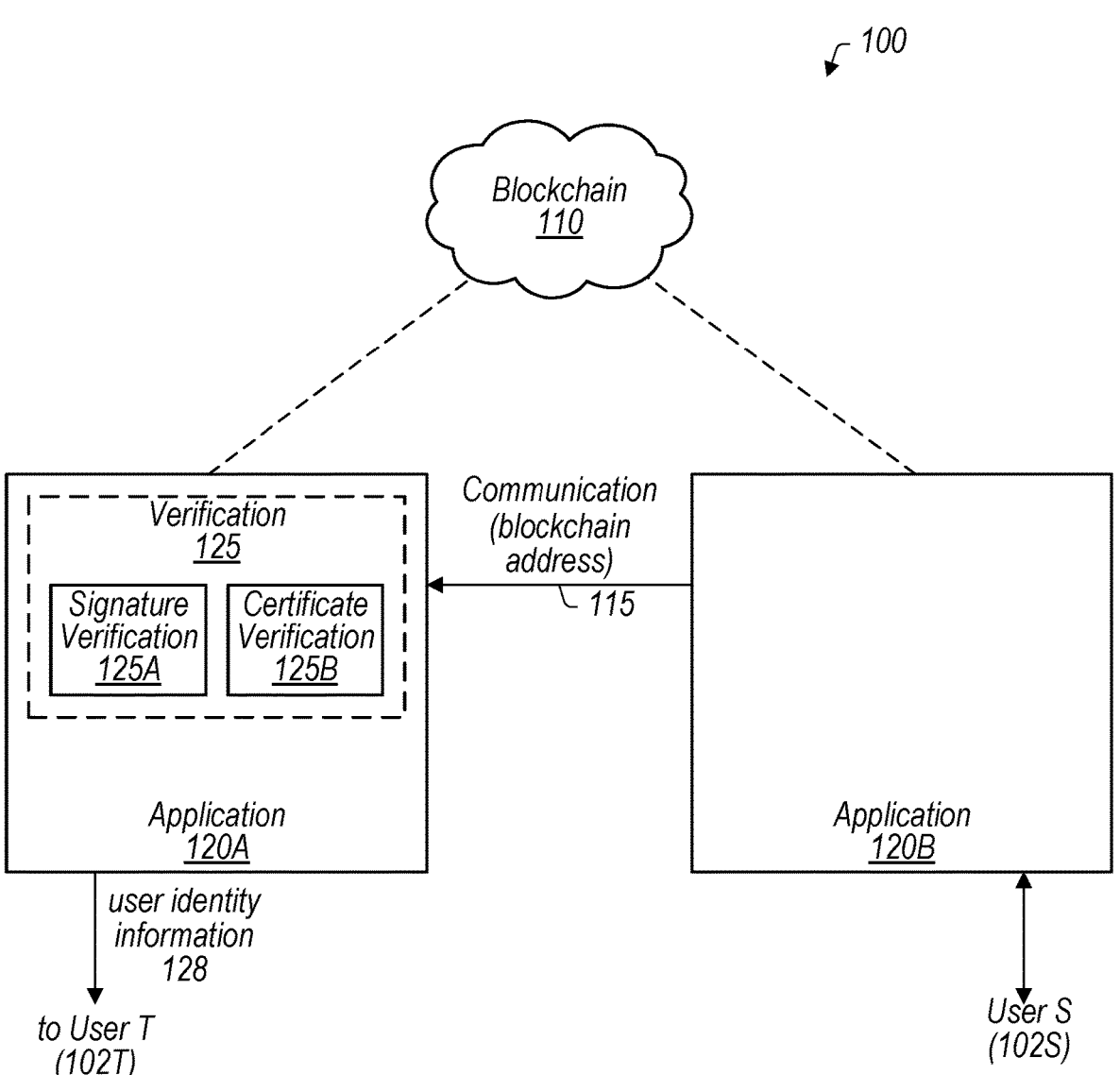
FIG. 1 is a block diagram of one embodiment of a system for authenticating blockchain addresses.

Currently, a common blockchain interaction may stem from a first user interacting with a second user via a website. The first user may wish to enter into a transaction with the second user. The second user may then supply the first user with the second user's blockchain address. This address can be a long hexadecimal string such as "0x0eb81892540747ec60f1389ec734a2c06b898ec8" (where "0x" indicates that the value is in hexadecimal). In some cases, the second user may need to copy this string from one application (e.g., a browser) into another application that is used to interact with the blockchain (e.g., a digital wallet application). The first user can then initiate a blockchain transaction with the second user using this address.

This paradigm is not without drawbacks. Blockchain transactions, once performed, are not reversible. That is, there is no mechanism by which a particular user can unilaterally undo a blockchain transaction. Of course, if a first user engages in a first blockchain transaction with a second user, the two users could agree to perform a second blockchain transaction that reverses the first. But these are two separate transactions, and a second transaction is subject to the willingness and the ability of both parties to undo a prior first transaction.

This general irreversibility of transactions can present problems. Accordingly, if a particular user makes an error in copying a blockchain address (e.g., by changing one digit) into an application, the resulting transaction may cause some digital asset to be transferred—irrevocably—to an unintended account. Still further, consider a scenario in which a user is interacting with a website that, unbeknownst to the user, has been compromised. This can lead to the user believing that the interaction is with entity X, when in fact, the interaction is with a different (malicious) entity, Y. Accordingly, when the user receives a blockchain address from malicious entity Y, the user may initiate a blockchain transaction to that address, not realizing the address is for entity Y and not the intended entity X.

The inventor has recognized that the current state of blockchain technology does not provide a straightforward means for verifying a recipient's blockchain address, particularly for unsophisticated users or users that are new to blockchains. Advanced blockchain users may be able to use prior blockchain transactions to determine information such as the frequency of transfers to a particular blockchain address. But such an approach is not practical for users that are not intimately familiar with blockchains.

The current state of blockchain technology is that transactions are occurring at the level of blockchain address to blockchain address. As noted, this approach is well-suited for early technology adopters. The inventor has recognized, however, that if blockchain is going to become more widely adopted, there need to be innovations that simplify blockchain interactions for a more general audience. The present disclosure is directed to such an innovation.

In particular, the present disclosure sets forth techniques that provide for simpler and more robust verification of destination blockchain addresses. The disclosed approaches rely on public key infrastructure (PKI), which refers to hardware, software, and associated policies and procedures that facilitate the creation, management, use, storage, and revocation of digital certificates and public keys. In other words, PKI is a catch-all term for everything used to establish and manage public keys nowadays. Public keys are not only part of an encryption process, but help authenticate the identity of communicating parties of devices. The present disclosure sets forth various embodiments in which PKI concepts are utilized to authenticate identities of blockchain users.

FIG. 1 illustrates one embodiment of a system 100 for authenticating blockchain addresses. As shown, system 100 includes a blockchain 110 and user applications 120. A blockchain, as has been described, is a type of distributed ledger system that is used to record and share information. Blockchain 110 can be accessed by various types of applications, as evidenced by the dotted lines connecting blockchain 110 and applications 120A-B.

Blockchain 110 may be any suitable type of blockchain, including public or private, either of which may be permissioned, permissionless, hybrid, etc. Blockchain 110 may also be a consortium or federated blockchain. Blockchain 110 may be used for any number of applications, including asset transfers, monitoring supply chains, digital IDs, digital voting, compliance, copyright/royalty protection, medical recordkeeping, managing legal documents such as wills, managing Internet of Things (IoT) devices, and tracking real-world items such as food, prescriptions drugs, hazardous materials, etc.

Applications 120, on the other hand, are any type of application that user S (indicated by reference numeral 102S, associated with application 120B) and user T (indicated by reference numeral 102T, associated with application 120A) use to communicate with one another. For example, application 120B may constitute a web server of user S that sends communication 115 to application 120A, which may constitute a web browser of user T. Applications 120A-B could also constitute email programs in another embodiment. Applications 120 can also be applications that permit interactions with blockchain 110. Applications 120 could thus be a web browser, a block explorer application (an application that can show the details of past blockchain transactions), a digital wallet, or any other suitable type of blockchain interface. Note that in a particular scenario, applications 120A and 120B need not be the same type of application.

As shown, application 120A of user T receives a communication 115 from application 120B of user S, where communication 115 includes information indicative of a blockchain address of User S. As will be described with respect to FIG. 2B, communication 115 may include a blockchain address, which is then used by an application of user T to retrieve, from a blockchain registry, 1) certificate information of user S and 2) a message signed by user S. In short, a communication between users S and T either includes, or is usable to retrieve, certificate information of user S and a message signed by user S.

As used herein, "certificate information" for user S refers to either a certificate of user S that has been issued by a certificate authority, or information usable to access that certificate. The certificate can include identity information of user S such as a name, website, address of user S, and is signed by a certificate authority (CA). The certificate can also include the public key of user S that was used to obtain S's certificate. The signed message, on the other hand, can indicate that user S is the owner of a particular blockchain address, and may also include user S's public key. Note that the public key included in the certificate and the signed message (as well as the corresponding private key) is distinct from the public-private key pair used to interact with blockchain 110. The former public-private key pair may be referred to as the "PKI key pair," while the latter may be referred to as the "blockchain key pair."

Verification module 125 may either be part of or distinct from application 120A, as indicated by the dotted line shown in FIG. 1. Sub-modules 125A-B act to verify the signed message and certificate of user S, respectively. Sub-module 125A can use the public key of user S (which is included in the certificate) to verify that the signed message was in fact signed by user S. Similarly, sub-module 125B can use the public key of the CA that signed the certificate to verify the signature on the certificate.

Verification module 125 can thus ascertain that user S's certificate (which can include identity information of S) is genuine and that whoever is controlling the identity of user S approves of the statement that S is the owner of a particular address on the blockchain. Furthermore, if both the certificate and the signed message include user S's public key, this establishes a link between the identity information of the certificate and the blockchain address of the signed message. (In other words, if the certificate of user S establishes that identity information K is tied to a particular public key, and the signed message of user S establishes that blockchain address X is tied to the same public key, this links identity information K to blockchain address X.)

Once user S's certificate and signed message are each verified by module 125, identity information 128 for user S can be provided to user T. Identity information 128 (which may include name, website, etc. for user S) may be provided, for example, via a user interface generated by verification module 125 for user T. In one implementation, a lengthy blockchain address of user S may be replaced in the user interface by, for example, the name of user S. This action allows user T to confirm the identity of user S before engaging in a blockchain transaction.

This approach will advantageously decrease erroneous or fraudulent transactions on the blockchain, particularly since such transactions cannot be unilaterally reversed. This approach also does not require blockchain users to have advanced knowledge in order to conduct transactions. On the contrary, even beginner blockchain users will be able to utilize this authentication technique. It is therefore believed that this approach will therefore lead to wider adoption of blockchain technology. This technique also advantageously relies on preexisting public key infrastructure for establishing trust relationships. Indeed, most browsers and operating systems are already set up to evaluate the validity of certificates issued by CAs.

Figure 2A:
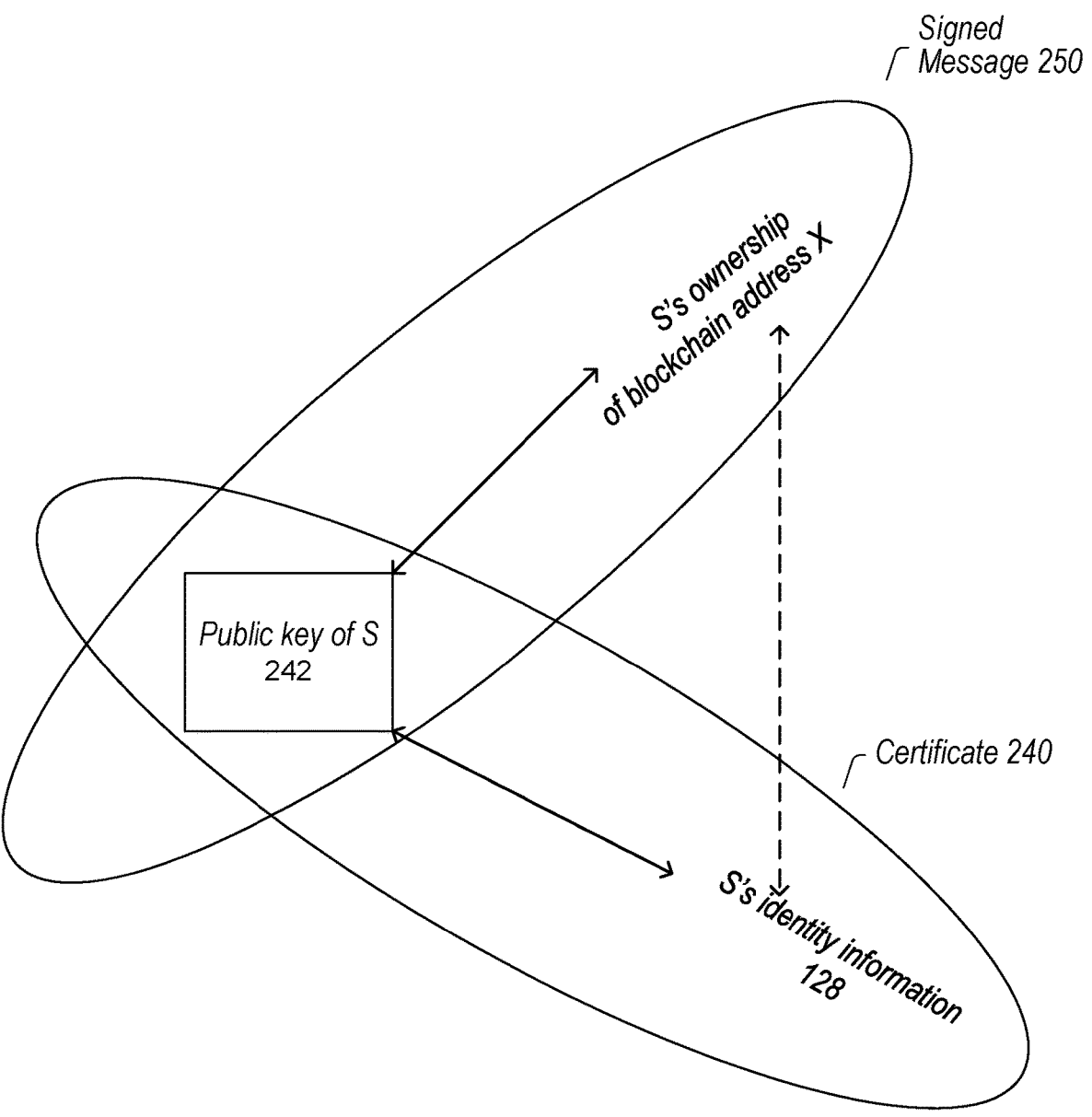
FIG. 2A is an example illustrating how a signed message and a certificate may be used to establish correspondence between a blockchain address and identity information of the entity that owns the blockchain address.

FIG. 2A illustrates how a certificate of user S and a message signed by user S can be utilized to connect a blockchain address with corresponding identity information in one embodiment. Example 200 shows the relationship between a signed message 250 and a certificate 240. Signed message 250 is signed by S's private key, which is part of a key pair that includes public key 242 and which was used by S to obtain certificate 240. The signature of signed message 250 can thus be verified using public key 242. Certificate 240, on the other hand, is signed by a private key of a certificate authority; this signature can be verified by a corresponding certificate authority public key.

In the depicted example, signed message 250 includes public key 242 of user S and an indication of ownership of a blockchain address X. For example, signed message 250 may include the assertion "User S owns blockchain address X." Signed message 250 can also include user S's public key 242. Signed message 250 can thus establish a correspondence between S's public key 242 and S's attestation of ownership of blockchain address X.

As shown, certificate 240 also includes public key 242, and additionally includes identity information 128 for user S. As will be described, identity information 128 may have been verified by the certificate authority during issuance of certificate 240. Certificate 240 can thus establish a correspondence between S's public key 242 and S's identity information 128. (Note that identity information 128 could also be present in signed message 250 in some embodiments.)

Signed message 250 thus links S's ownership of blockchain address X to public key 242, and certificate 240 links S's identity information 128 to public key 242. Because public key 242 is present in both signed message 250 and certificate 240, these two pieces of information can serve to establish a correspondence between blockchain address X and identity information 128. Stated another way, if verification module 125 can verify the signatures of both signed message 250 and certificate 240, it can be established that blockchain address X corresponds to identity information 128. Identity information 128 can thus be provided to user T in addition to, or in lieu of, blockchain address X.

In other embodiments, different types of information may be available to verification module 125 in order to determine identity information 128 for blockchain address X.

Figure 2B:
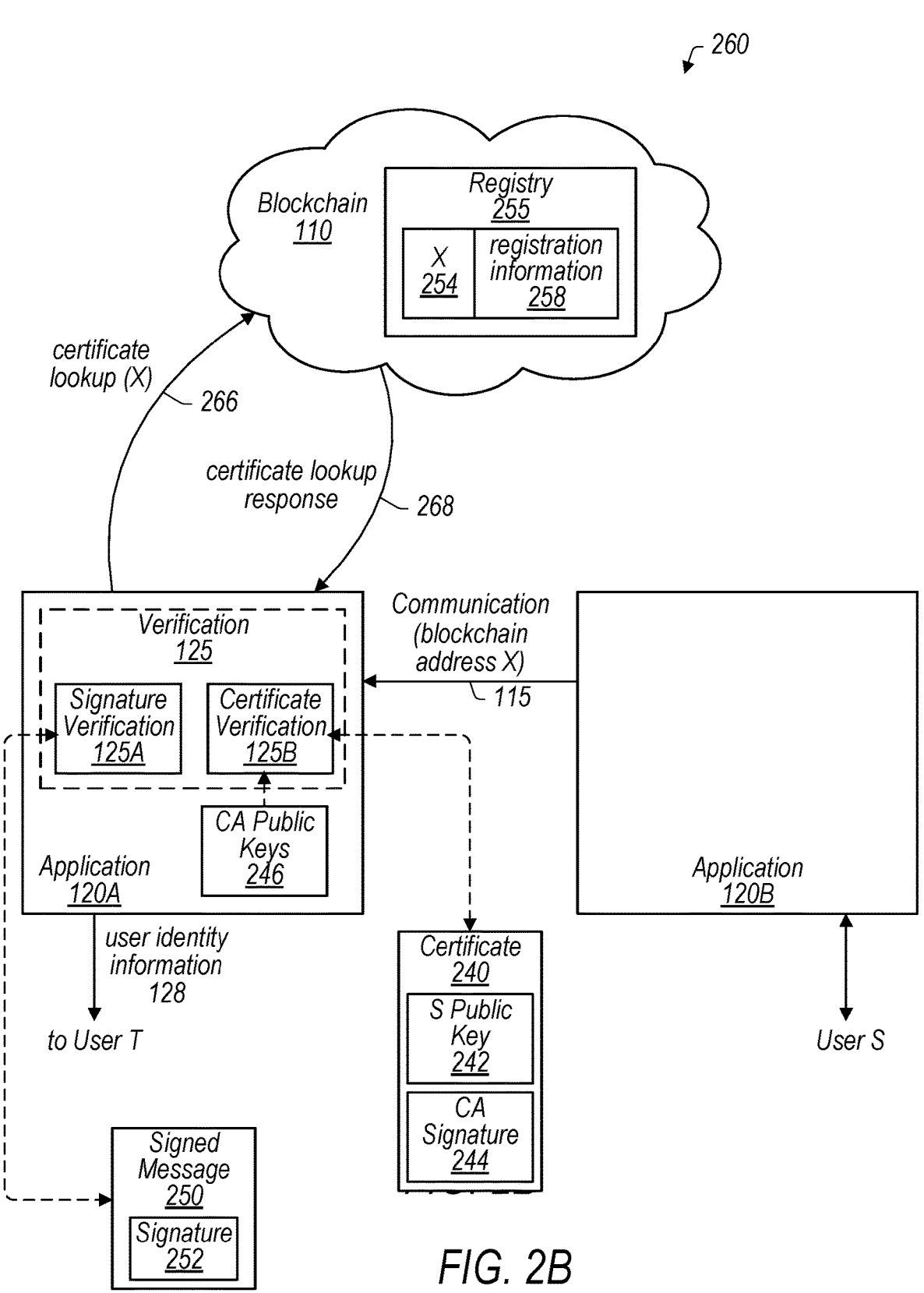
FIG. 2B illustrates a registry-based embodiment for determining identity information corresponding to a blockchain address.

FIG. 2B is a block diagram illustrating an approach for blockchain address authentication that falls under the general approach illustrated in FIG. 1. As shown, computer system 260 includes a registry 255. Registry 255 may be implemented as part of blockchain 110 in one embodiment (e.g., as a smart contract). Registry 255 stores, for a given blockchain address, registration information 258, which may include a signed message and certificate information. As shown, registry 255 stores registration information 258 for blockchain address X, as indicated by reference numeral 254. As will be described with respect to FIG. 3, registration information 258 has previously been written to registry 255 by user S using a registration application programming interface (API) of registry 255.

When application 120A or verification module 125 receives blockchain address X, a lookup API of registry 255 may be invoked. As shown, application 120A or verification module 125 can pass blockchain address X to registry 255 as part of certificate lookup 266. Registry 255 then returns certificate lookup response 268, which can return registration information 258, such as signed message 250 and certificate 240 in one implementation. If blockchain address X is not stored in registry 255, certificate lookup response can return an "error/empty" indication in some embodiments.

As previously described, applications 120A-B can be any applications associated with users T and S, respectively. For example, application 120B may be code executing on a website of user S, while application 120A is a browser. Verification module 125 may either be a part of application 120A, or a separate application, as denoted by module 125 being represented using a dotted line in FIG. 2B.

Note that, in some embodiments, more than one certificate may be provided as part of certificate information within registration information 258. For example, certificate 240 may be an end-user certificate issued by a leaf certificate authority. The leaf certificate authority has a leaf private key and a leaf public key (e.g., CA public key 246). The leaf certificate authority, in turn, may have a certificate issued by an intermediary certificate authority. This leaf certificate can include a leaf public key and is signed using the private key of the intermediary certificate authority. Still further, the intermediary certificate authority may have a certificate issued by a root certificate authority. In such a case, this intermediate certificate can include an intermediate public key and is signed using a private key of the root certificate authority. Accordingly, certificate information within registration information 258 may include a chain of certificates, and certificate verification module 125B may store multiple CA public keys in order to verify each certificate in the chain.

In some embodiments, as part of certificate lookup response 268, application 120A/verification module 125 may receive signed message 250 and either S's certificate 240, or information usable to retrieve S's certificate 240.

As has been described, signed message 250 can establish a correspondence between S's public key 242 and S's blockchain address X. Signed message 250 includes a signature 252 made by S's private key; signature 252 can be verified by signature verification module 125A using S's public key 242. Similarly, certificate 240 can establish a correspondence between S's public key 242 and S's identity information 128. Certificate 240 includes a signature 244 made by a private key of a certificate authority. CA signature 244 can be verified by certificate verification module 125B using CA public key(s) 246. Accordingly, if signature verification module 125A and certificate verification module 125B verify signed message 250 and certificate 240 respectively, identity information 128 can be provided to user T instead of or in addition to blockchain address X.

The approach of FIG. 2B has a simple interface between user S and user T, as only a blockchain address needs to be passed between user S and user T in order to authenticate blockchain address X. As has been described, registry 255 can be implemented with two APIs in some embodiments: a registration API and a certificate lookup API. One embodiment of the registration process is described next with respect to FIG. 3.

Figure 3:
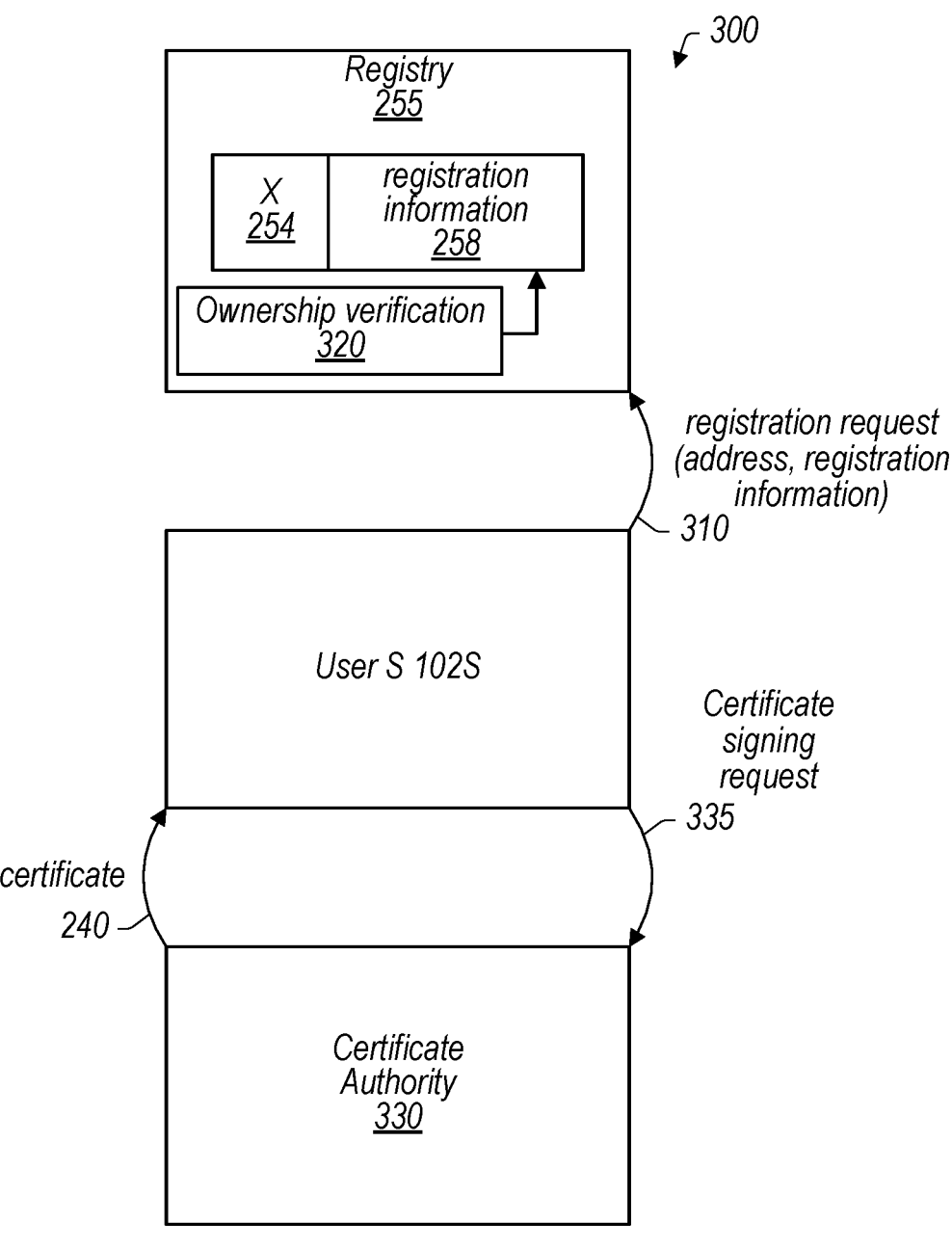
FIG. 3 is a block diagram of illustrating one embodiment of a process of registering a blockchain address in a registry on the blockchain.

FIG. 3 is a block diagram 300 illustrating steps involved in one embodiment of a registration process for a particular blockchain address X. Depicted are registry 255, user S (indicated by reference numeral 102S), and a certificate authority 330.

As has been described, the present inventor proposes utilizing PKI resources in order to authenticate blockchain addresses. A first step in this process is for user S to obtain a certificate from certificate authority 330. Certificate authorities such as 330 have their own public-private key pairs, which they use to sign certificates. In order to obtain a certificate, user S submits a certificate signing request (CSR) 335 to certificate authority 330. CSR 335 may include a certificate that includes S's public key 242, along with identity information 128 for user S. Certificate authority 330, after verifying CSR 335, will sign the certificate in CSR 335 with its private key and return the signed certificate as certificate 240 to user S.

Once user S has obtained certificate 240, user S can proceed to register one or more addresses with blockchain 110. Registration can be performed by using a registration request 310 made via a registration API of registry 255. Generally speaking, registration request 310 includes an address to be registered, along with registration information 258, which will be stored in a location within registry 255 that corresponds to the address being registered. But before registration information 258 in stored in registry 255, an ownership verification 320 is performed in order to ensure that request 310 is coming from the entity that owns the address for which registration is being attempted. One means of performing ownership verification 320 is by verifying a signature of registration request 310 or a signature included within registration request 310. Blockchain 110 stores S's blockchain public key that is associated with S's blockchain account. Accordingly, if some or all of request 310 is signed using S's blockchain private key, registry 255 can verify this signature using S's blockchain public key. (Again, S's blockchain public and private keys are generally distinct from the public and private keys used to obtain certificate 240.) For example, the entirety of request 310 might be signed using S's blockchain private key. This signature can be verified using S's blockchain public key as part of ownership verification 320. (Note that registering an address does not prove that the address indeed belongs to the entity written in the registration information. Rather, registering an address proves only that the registering entity controls the address in question.) Once S's ownership is verified, registration information 258 is stored in registry 255. For example, registration information 258 may include signed message 250 and certificate information such as certificate 240. Registration information can subsequently be retrieved as described with respect to FIG. 2B.

In some embodiments, verification of the contents of registration information 258 is not performed by registry 255. As will be described below with respect to FIG. 5A, for example, verification module 125 can perform such checking. In other embodiments, however, this checking could be performed by registry 255. Thus registry 255 could verify that signed message 250 is directed to the same address that is being registered. Accordingly, if address X is being registered and signed message 250 asserts that "S owns address Y," a registration error might result. Similarly, registry 255 could determine whether the entity identified in signed message 250 matches the entity identified in certificate 240.

In general, using the disclosed techniques, if an application indicates that address X belongs to party S, this indication is true unless one of the following caveats is true: (1) the PKI system is broken, (2) S has been compromised, or (3) the owner of X has been compromised. Consider the case in which a certificate was registered by a party P instead of S. If P is able to create a valid certificate that associates X with S, this implies condition (1) or (2) has occurred. Similarly, if P is able to register address X, this implies that condition (3) has occurred.

Various implementations of registry 255 are now described with respect to FIGS. 4A-D.

Some blockchains support (or require) "memos" or "tags." For example, some blockchains may use a centralized address, and a separate memo/tag field is used to specify the transaction recipient. Alternatively, a memo/tag field may be used for the receiving party to be able to identify the sending party. In either case, registry 255 may allow a registration request 310 to include not only an address, but a separate tag. (The term "tag" is used to describe an extra field in addition to a blockchain address. This field may be used to identify a sender or recipient in some implementations. The term "tag" is intended to encompass the term "memo" or any other equivalent term.)

Figures 4A, 4B:
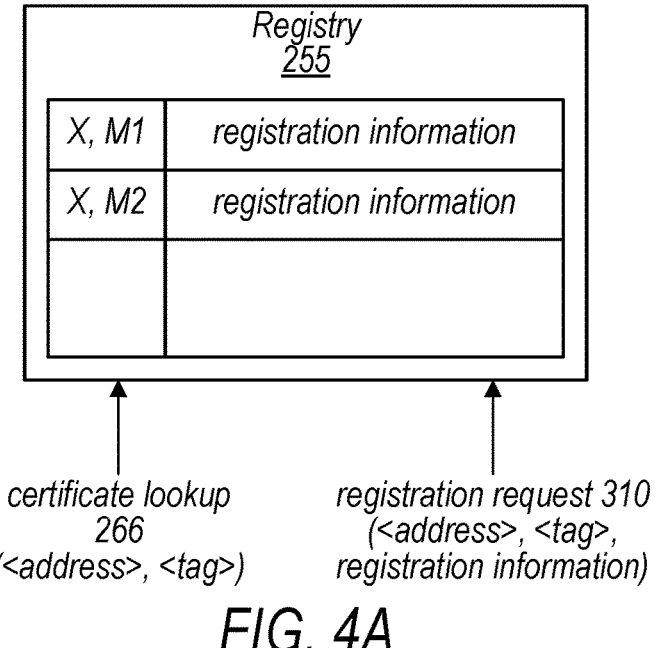
FIG. 4A is a block diagram illustrating an example of a system for registering address and tags as a pair in the registry on the blockchain, according to some embodiments.
FIG. 4B is an example illustrating different types of signed messages for storage in a blockchain registry, according to some embodiments.

FIG. 4A illustrates an embodiment in which registry 255 supports tags. Accordingly, a registration request 310 may contain not only an address but also a second, optional component. This allows applications to register a particular blockchain address multiple times with different identifying information. For example, an "omni-wallet" might use a single blockchain address X, but use a different tag for each user (e.g., M1, M2) to manage their deposits.

Registry 255 verifies a registration request of the form <address, tag> as described above and registers the information in registration request (address, tag, registration information) in a particular registry record. Once this information is stored in registry 255, a requesting entity can request a certificate lookup 266 by supplying <address, tag> to registry 255. In one embodiment, registry 255 first checks whether the combination <address, tag> are registered, and if not, whether just the address is registered. If either combination is found to be registered, the stored registration information is returned to the requesting entity.

FIG. 4B depicts different examples of signed messages that may be stored as registration information in registry 255. In various embodiments, these signed messages can either be formatted (e.g., using JavaScript Object Notation (JSON) etc.) or unformatted. Signed message 250A is signed with signature 252, which is made by S's private key. Here, message 450A includes information 422 indicating that address X belongs to S, as well as S's public key 242. Signed message 450B, however, may include additional information, particularly S's name 424 and S's website 426. Many different types of additional information may be included in signed messages, such as the recipient's deposit address.

Figure 4C:
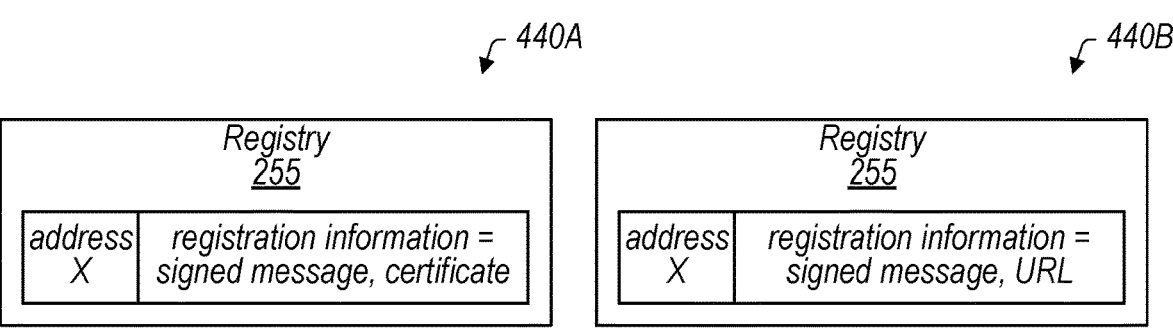
FIG. 4C is a diagram illustrating different examples of certificate information stored in a blockchain registry, according to some embodiments.

FIG. 4C illustrates that a certificate in registry 255 may be replaced with a uniform resource locator (URL) that is secured using hypertext transfer protocol secure (HTTPS). In example 440A, registration information includes a signed message and a certificate (or a chain of certificates). In example 440B, registration information includes a signed message and a URL.

In example 440B, then, the user has registered the mapping of the address 'X' to URL (e.g., addr X=URL U) in registry 255. An application wishing to verify address X will invoke the certificate lookup API of registry 255 as previously described. The stored URL (e.g., https://www.foo-.com) will be returned as part of response 268 and thus will be available to the application. The application can then fetch the URL using HTTPS. The website hosting the URL will respond with a certificate, issued and signed by a CA, that includes S's public key. The browser can verify the CA's signature using its public key. Identity information in the certificate can then be supplied to user T as has been described.

When the URL is secured by HTTPS, in some embodiments, a fetch of the URL may return all the details included in the message for the given address (e.g., a JSON-formatted message that incudes details "company: foo, address: X and purpose: payment for a book"). In such embodiments, the appropriate security is still present as HTTPS certificates are validated as a part of the URL fetch.

Using this approach, certificates may be updated without modifying the information stored in registry 255. URLs can also be much shorter than certificates (and thus save space). But under this approach, there would need to be a web server set up to host content for any URLs stored in registry 255.

Figure 4D:
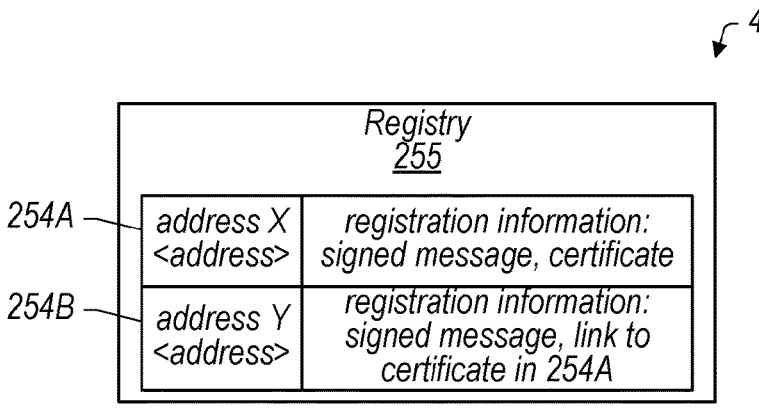
FIG. 4D is a diagram illustrating one embodiment of a blockchain registry that reuses certificate information for multiple addresses.

In some cases, storing information on-chain in registry 255 may be expensive. FIG. 4D depicts an embodiment of registry 255 in which certificate information can be reused for several addresses. As shown in example 460, registry 255 includes an address 254A storing registration information that includes a signed message and a certificate. As explained, the signed message may specify "Account X belongs to S," include S's public key, and be signed by S's private key. The certificate in address 254A, meanwhile, may include S's public key and identity information of S.

Suppose S wishes to register a different address Y on the blockchain. The inventor has recognized that there is no need to store the same certificate information in 254A in address 254B (the registry location for address Y). Accordingly, registration information in 254B can include a reference (e.g., link) to either address 254A or the certificate within address 254A. This methodology prevents a user from having to store two copies of its certificate information in registry 255. This approach also applies to a user registering the same address with multiple tags. Thus, the combination <address, M2> can include a reference to the certificate stored in the combination <address, M1> previously stored, as indicated in FIG. 4A.

Figure 5A:
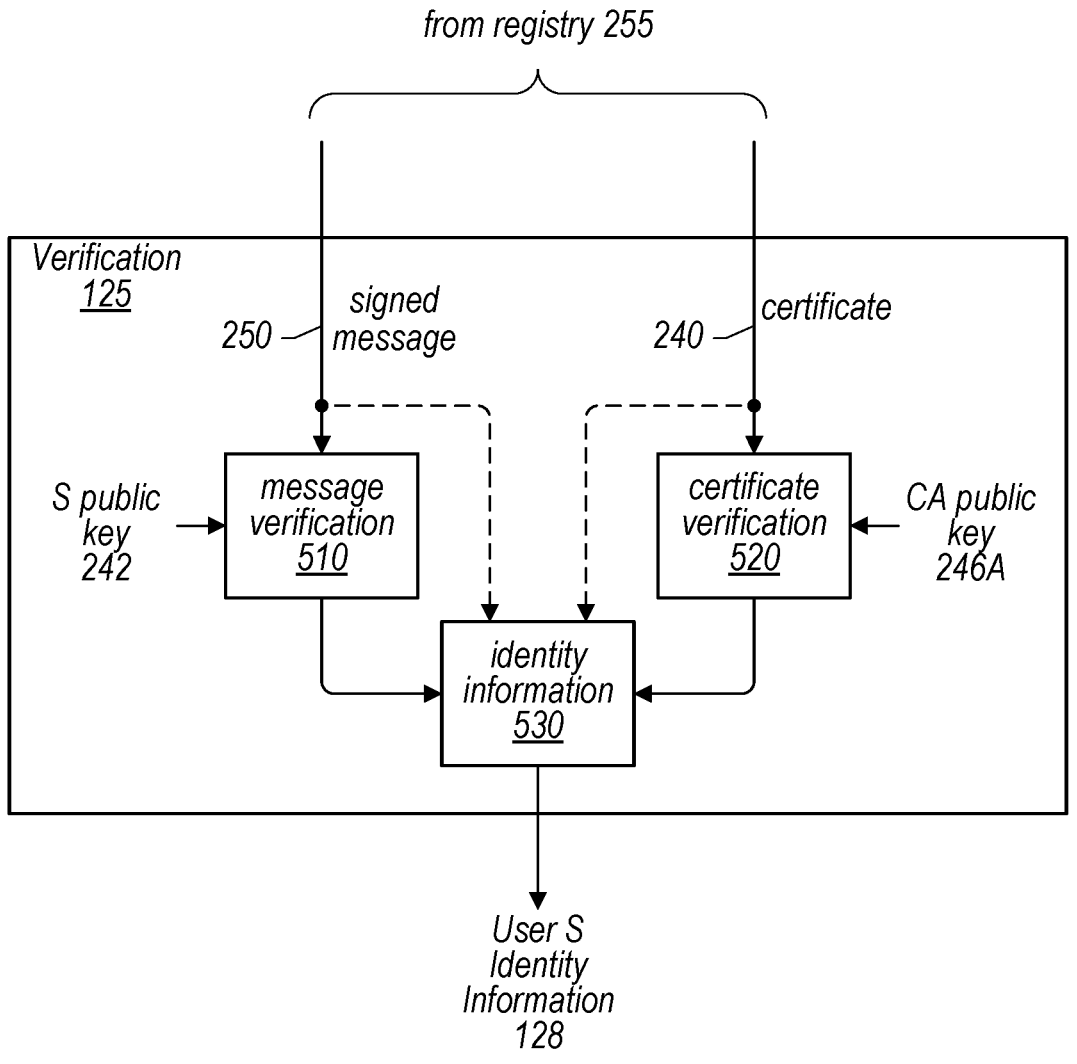
FIG. 5A is a block diagram of a verification module for verifying entity information associated with a blockchain transaction.

FIG. 5A is a block diagram of one embodiment of a verification module 125 for verifying information associated with a participant in a blockchain transaction. As shown, verification module 125 can include a message verification sub-module 510, a certificate verification sub-module 520 and an identity information sub-module 530. As has been described, module 125 may be part of an application that receives blockchain address information from another entity, or it can be part of a separate application. In the context of FIG. 1, for example, verification module may be part of, or distinct from, application 120A.

As depicted, verification module 125 receives signed message 250 and certificate 240. (Alternatively, module 125 may receive other certificate information, such as a URL usable to fetch a certificate.) These pieces of information may be received, for example, directly from registry 255 (e.g., as shown in FIG. 2B).

In the depicted embodiment, verification module 125 performs two separate verification tasks, which can be performed concurrently or in any order. Message verification sub-module 510, in various embodiments, is executable to receive signed message 250. Sub-module 510 uses the public key of the user (which may be included in the message itself) to verify the signature on the message. The result of the signature check may then be sent to identity information sub-module 530, potentially along with any identity information included in signed message 250.

In some embodiments, message verification sub-module 510 is also executable to check the content of signed message 250. Suppose that in response to a registry lookup for address X, resulting signed message 250 states "S owns address Y" or "R owns address Y." In such instances, sub-module 510 can cause the authentication of blockchain address X to fail, and a corresponding message to be presented to user T. In other words, sub-module 510 can check to ensure that the content of signed message 250 corresponds to the address for which the registry lookup was performed.

Certificate verification sub-module 520, on the other hand, is executable to receive certificate 240 or information usable to retrieve certificate 240. As has been discussed, certificate 240 has been issued by a CA and signed by a private key of the CA. Sub-module 520 can thus use CA public key 246 stored in order to validate the signature on the certificate. Sub-module 520 can then send the result of the signature verification, along with any identity information in certificate 240, to identity information sub-module 530.

Identity verification sub-module 530, as has been explained, is executable to receive signature verification results and identity information from sub-modules 510 and 520. If either verification check fails, sub-module 530 may provide failure information to this effect to user T. Sub-module 530 may, in some embodiments, further check that the entity asserted to be the owner of the blockchain address in signed message 250 matches the entity identified in certificate 240. For example, if signed message 250 states "R owns address X" and certificate 240 identifies S, sub-module 530 can cause the authentication procedure to fail. If, on the other hand, the checks performed by sub-modules 510 and 520 and any further checks by sub-module 530 pass (e.g., determining whether the entity identified in signed message 250 matches the entity identified in certificate 240), sub-module 530 may determine what identity information is to be presented to user T. For example, in some cases, identity information can be in both signed message 250 and certificate 240. Sub-module 530 may decide what information to present to user T. and may also perform other checks as well, such as a determination of a risk associated with a particular entity.

Example user interfaces that may be provided to user T are now described with respect to FIG. 5B.

The present disclosure has described various techniques for authenticating blockchain addresses. One motivation for these embodiments is to provide blockchain users more visibility into the parties with whom they engage in transactions. FIG. 5B depicts two examples of user interfaces that can be generated using identity information obtained using approaches described above.

User interface 570A is an example interface provided to a first user (e.g., user T) in response to a requested transaction with a second user (e.g., user S in various Figures above). At this point, the first user has taken steps to initiate a transaction with the second user—for example, by copying the second user's blockchain address into the first user's digital wallet in order to perform a transaction. Without the techniques of the present disclosure, there is no easily invoked mechanism for the first user to authenticate the second user's blockchain address. But by applying the teachings of this disclosure, an application of the first user can use the blockchain address in order to determine identity information of the second user.

At the point user interface 570A is to be displayed, identity information 128 corresponding to the second user's blockchain address has been obtained. This identity information includes, for example, the name of the entity (Acme, Inc.) and the address and website of the entity. This identity information is displayed to the first user, along with a final prompt to initiate the blockchain transaction. In this manner, the first user can be given additional information beyond the blockchain address before commencing with an irreversible transaction. Example 570A also illustrates that additional types of information may also be given to the user, such as the number of blockchain transactions involving this address and the last blockchain transaction.

User interface 570B is similar to user interface 570A. In 570B, however, the blockchain address shown in 570A has been replaced with the name of the entity associated with that address. Interface 570B also illustrates that additional types of information stored by the application may also be provided to the first user—for example, a "risk score" for the transaction can be provided based on information available to the application of the first user. Interface 570B indicates, for example, that a transaction with Acme, Inc. is considered "safe."

As has been noted, techniques of the present disclosure can be applied to many different types of blockchain transactions. In addition to transactions involving cryptocurrency, blockchain transactions can also involve other types of digital assets—for example, non-fungible tokens (NFTs). The authenticity of a given NFT can be verified by applying the methods described herein to the address of the NFT creator. NFT creators, such as DISNEY can then sign the address that created their NFTs using disclosed methods to guarantee to users that the NFTs were created by them. An application that helps interface with NFTs, upon verifying the relevant signatures, can show the user an indication of the creator of an NFT by displaying identity information of the NFT creator.

FIG. 6A is a flow diagram of one embodiment of a method 600 for verifying identity information of a user. Method 600 begins at 605, in which an application of a first user receives a communication from a second user. The communication is indicative of an association between an address on a blockchain and the second user. This communication may include just a blockchain address (as in FIG. 2B). As has been described, the certificate information may include a certificate, a URL usable to retrieve the certificate, etc.

In 610, the certificate and signed message of the second user are verified (e.g., by a verification module, such as may be included in an application of the first user). The certificate, which includes a public key of the second user, can be verified using a public key of the certificate authority (CA). The signed message, which is an indicative of the association between the address on the blockchain and the second user, is verified using the public key of the second user that is part of the key pair used to establish an account on the blockchain.

Finally, in 615, the identity information of the second user is provided to the first user, after verifying the certificate and signed message. This information may be included, for example, in the certificate. In some cases, the identity information may be provided to the first user in lieu of the blockchain address. In other implementations, both the identity information and the blockchain address may be presented to the user. In certain embodiments, the identity information may be presented to the first user along with a risk score associated with the second user.

A paradigm that utilizes a blockchain registry was described above with reference to FIG. 2B. In various embodiments, such a blockchain registry can utilize two APIs: one in which the owner of a blockchain address registers the address with the registry, and one in which an entity performs a lookup of a blockchain address in the registry. Example methods of utilizing these APIs are now described with respect to FIGS. 6B and 6C, respectively.

FIG. 6B is a flow diagram of one embodiment of a method 630 for registering a blockchain address in a blockchain registry. Method 630 can thus be used with the paradigm described above with reference to FIG. 2B. More particularly, method 630 can be practiced by a software module within the registry when a registration API is invoked by an entity having an account (and thus an address) on blockchain 110. In some embodiments, method 630 can be performed as part of a smart contract by blockchain 110.

Method 630 begins at 635, in which a server computer system receives, from a registering entity, a registration request for a blockchain address. Here, "registering entity" refers to any party that invokes the registration process. Generally speaking, the registration request can include any type of information, particularly information that will subsequently allow another party to verify an identity of the registering entity. For example, the registration request can include certificate information and a signed message.

In 640, the system verifies the registration request. The purpose of 640 is to ensure that the registration request has been made by the entity that owns the blockchain address being registered. The verification includes system authenticating the ownership information of the registering entity. Generally speaking, proving ownership of a blockchain address is performed using the private key associated with that address. Accordingly, verifying the registration request may be performed by verifying a signature in the registration request with the public key corresponding to the private key. In some embodiments, the registration request may constitute a package with multiple components, where the package is signed using the private key of the registering entity. In other embodiments, only a portion of the information in the registration request may be signed.

In 645, the server computer system, in response to the registration request being verified, stores the registration information included in the registration request in a first record of the registry of the blockchain. The registered information can later be retrieved from the registry and can be used to verify a certificate of a registering entity, and a signed message using a public key of the registering entity; and determine identity information of the registering entity. The registered information may include certificate information and the signed message. As noted, the certificate information may include the certificate itself or a URL that can be fetched to retrieve the certificate. The certificate is signed by a certificate authority (CA) using its private key and can therefore be verified using CA public key.

Numerous modifications and additions to method 630 are contemplated and possible. For example, the server computer system may receive, from a requesting entity, a certificate lookup that may specify the blockchain address. The system will then return the registration information stored in the registry in response to the certificate lookup. In some embodiments, the registration request may specify a tag in addition to the blockchain address, and in such instances, the certificate lookup may specify the tag. Accordingly, the server computer system will return the registered information in response to determining that the blockchain address has been registered in combination with the tag in the registry.

In some embodiments, verifying the registration request may include verifying a signature of the registration request (which has been made using the blockchain private key of the registering entity) using a blockchain public key of the registering entity. The registration information may include a certificate of the registering entity that includes the public key of the registering entity. The registration information may also include a signed message that specifies a name and a website of the registering entity. In some embodiments, the registration information may include a URL. The URL, when fetched using a HTTPS protocol, returns the certificate that contains public key of the registering entity.

In some instances, the server computer system may receive a second registration request. The registration request may specify a second blockchain address of the registering entity and may include a second signed message signed by the registering entity. The server computer system may verify the second registration request and may store the second signed message in a second record in the registry. The information stored in the second record may not include any certificates and may instead include a reference to one or more certificates stored in the first record, thus saving space in the registry.

FIG. 6C is a flow diagram of one embodiment of a method 660 for invoking an application programming interface (API) of a blockchain registry in order to retrieve information associated with a blockchain address.

Method 660 begins at 665, in which an application executing on a computer system detects a request by a first user to perform a blockchain transaction. The request includes information specifying a blockchain address of a second user on a blockchain. In some embodiments, the application may be a block explorer application.

In 670, the application invokes an application programming interface (API) of a registry of the blockchain. In such embodiments, invoking includes passing the address received from the second user, as a parameter of the API. Unlike the registration process, which can only be performed by the owner of a particular blockchain address, method 660 can be performed by any entity.

In 675, in response to information returned from the registry, the application identifies registered information stored in a location in the registry corresponding to the address passed to the API. The registered information may constitute any information stored in the registry location. For example, the registered information may include a certificate and a signed message.

Next, in 680, the application verifies the registered information. This includes verifying a certificate of the second user using a certificate authority (CA) public key, where the certificate includes the public key of the second user. The verifying of 680 also includes verifying a signed message of the second user using the second user's public key. The signed message is signed by the second user's private key, and is indicative of the association between the blockchain address and the second user.

Finally, in 685, the application provides identity information of the second user to the first user in response to the registered information being verified. The identity information may be provided instead of or in addition to the blockchain address. The identity information can be provided within a digital wallet, for example. The identity information may include one or both of the name and website of the second user, in some embodiments.

In addition to methods 600, 630, 660, and their variants, non-transitory, computer-readable media storing program instructions executable to implement such methods are also contemplated, along with systems configured to implement these methods.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various software operations that are performed in the context of one or more computer systems. Applications 120A-B can each execute on respective computer systems, for example. Similarly, registry 255 can be implemented on a computer system associated with a blockchain. Each of these components, then, is implemented on physical structure (i.e., on computer hardware).

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C.

This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A system, comprising:

a processor subsystem;

a memory storing program instructions executable by the processor subsystem to perform operations, the operations comprising:

detecting, by an application of a first user, a request to perform a blockchain transaction, wherein the request includes information specifying a blockchain address of a second user, wherein the blockchain address corresponds to a first public key of a blockchain key pair of the second user;

invoking, by the application, an application programming interface (API) of a registry of a blockchain, wherein the invoking includes passing the blockchain address to the API;

identifying, by the application in response to invocation of the API, registration information stored in a record of the registry that corresponds to the blockchain address, wherein the registration information includes a signed message that includes the blockchain address of the second user; and verifying, by the application, the registration information, wherein the verifying includes:

verifying a certificate of the second user using a certificate authority (CA) public key, the certificate including a second public key of a public key infrastructure (PKI) key pair of the second user, wherein the second public key of the PKI pair is distinct from the first public key of the blockchain key pair; and verifying the signed message using the second public key of the second user, wherein the signed message is signed by a private key of the PKI pair and corresponding to the second public key included in the certificate to establish an association between the blockchain address and the second user; and in response to the registration information being verified, providing, by the application, identity information of the second user to the first user.

2. The system of claim 1, wherein the registration information includes the certificate of the second user and the signed message.

3. The system of claim 2, wherein the signed message represents that the second user owns the blockchain address, and wherein the blockchain address constitutes a hash of the first public key of the blockchain key pair of the second user.

4. The system of claim 1, wherein the registration information includes a uniform resource locator (URL) and the signed message, the URL having an address that, when fetched using a hypertext transfer protocol secure (HTTPS) protocol, returns the certificate.

5. The system of claim 1, wherein the identity information includes a name of the second user, a website of the second user, or both.

6. A method, comprising:

receiving, at a server computer system from a registering entity, a registration request for a blockchain address, wherein the blockchain address corresponds to a first public key of a blockchain key pair of the registering entity;

verifying, by the server computer system, the registration request; and in response to the registration request being verified, storing, by the server computer system, registration information from the registration request in a first record of a registry of a blockchain, wherein the registration information includes a signed message that includes the blockchain address of registering entity; and wherein the registration information is retrievable from the registry and is usable to:

verify a certificate of the registering entity using a certificate authority (CA) public key, the certificate being signed by a CA private key; and verify the signed message using a second public key of a public key infrastructure (PKI) key pair of the registering entity, the signed message being signed by a private key of the PKI pair and corresponding to the second public key included in the certificate to establish an association between the blockchain address and the registering entity, wherein the second public key of the PKI pair is distinct from the first public key of the blockchain key pair; and determine identity information of the registering entity.

7. The method of claim 6, further comprising, after first record has been stored in the registry:

receiving, at the server computer system from a requesting entity, a certificate lookup that specifies the blockchain address; and in response to the certificate lookup, returning, by the server computer system, the registration information.

8. The method of claim 7, wherein the registration request specifies a tag in addition to the blockchain address, wherein the certificate lookup additionally specifies the tag, and wherein the server computer system, in response to the certificate lookup, returns the registration information in response to determining that the registry stores information indicating that the blockchain address has been registered in combination with the tag.

9. The method of claim 6, wherein the verifying the registration request includes verifying a signature of the registration request using the first public key of the blockchain key pair of the registering entity, the registration request being signed by a blockchain private key of the blockchain key pair of the registering entity.

10. The method of claim 6, wherein the registration information includes the certificate of the registering entity.

11. The method of claim 6, wherein the registration information includes a uniform resource locator (URL), the URL having an address that, when fetched using a hypertext transfer protocol secure (HTTPS) protocol, returns the certificate.

12. The method of claim 6, wherein the signed message includes the first public key of the registering entity.

13. The method of claim 12, wherein the signed message specifies a name and a website of the registering entity.

14. The method of claim 6, further comprising:

receiving, at the server computer system, a second registration request specifying a second blockchain address of the registering entity and including a second signed message signed by the registering entity; and in response to the second registration request being verified, storing, by the server computer system, the second signed message in a second record in the registry along with a reference to certificate information stored in the first record, such that the second record does not include the certificate information itself.

15. A method, comprising:

detecting, by an application executing on a computer system, a request for a first user to perform a blockchain transaction, the request including information specifying a blockchain address of a second user on a blockchain, wherein the blockchain address corresponds to a first public key of a blockchain key pair of the second user;

invoking, by the application, an application programming interface (API) of a registry of the blockchain, wherein the invoking includes passing the blockchain address as a parameter of the API;

identifying, by the application in response to information returned from the registry, registered information stored in a record of the registry that corresponds to the blockchain address, wherein the registered information includes a signed message that includes the blockchain address of the second user;

verifying, by the application, the registered information, wherein the verifying includes:

verifying a certificate of the second user using a certificate authority (CA) public key, the certificate including a second public key of a public key infrastructure (PKI) key pair of the second user, wherein the second public key of the PKI pair is distinct from the first public key of the blockchain key pair; and verifying a signed message using the public key of the second user, the signed message being signed by a private key of the PKI pair and corresponding to the second public key included in the certificate to establish an association between the blockchain address and the second user; and in response to the registered information being verified, providing, by the application, identity information of the second user to the first user.

16. The method of claim 15, wherein the identity information includes one or both of a name and a website of the second user.

17. The method of claim 16, wherein providing the identity information includes replacing, in a user interface to be presented to the first user, the blockchain address with the identity information.

18. The method of claim 15, wherein the registered information includes the certificate of the second user and a signed message.

19. The method of claim 15, wherein the registered information includes a uniform resource locator (URL) and a signed message, the URL having an address that, when fetched using a hypertext transfer protocol secure (HTTPS) protocol, returns the certificate.

20. The method of claim 15, wherein the application is a block explorer application.

\* \* \* \* \*